July 12, 1955

J. H. MacPHEE 2,712,856

RETRACTABLE DRIVE WHEEL LIFT AND HANGER

Filed May 10, 1954

INVENTOR
John H. MacPhee

Ralph Burch
Attorney

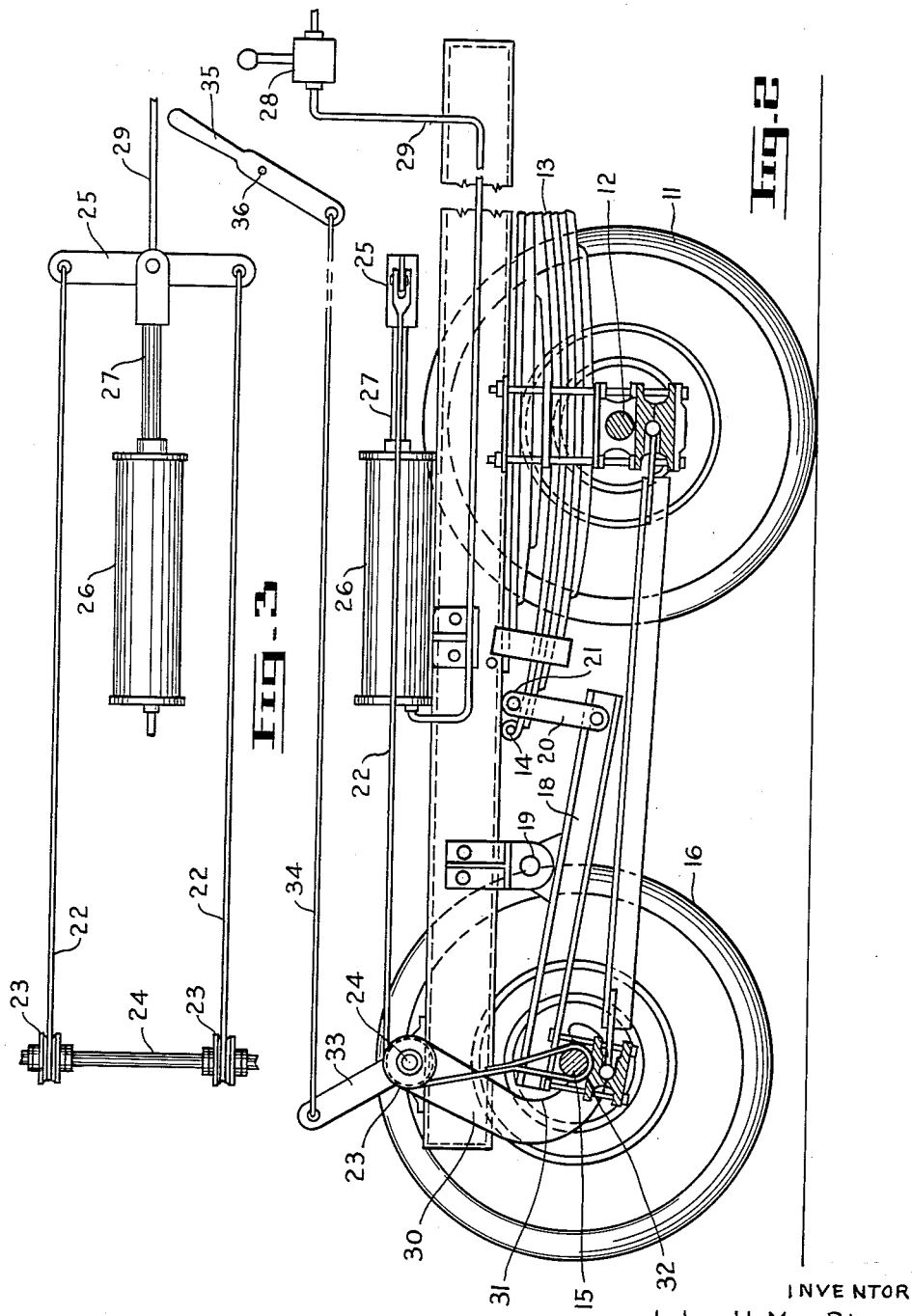

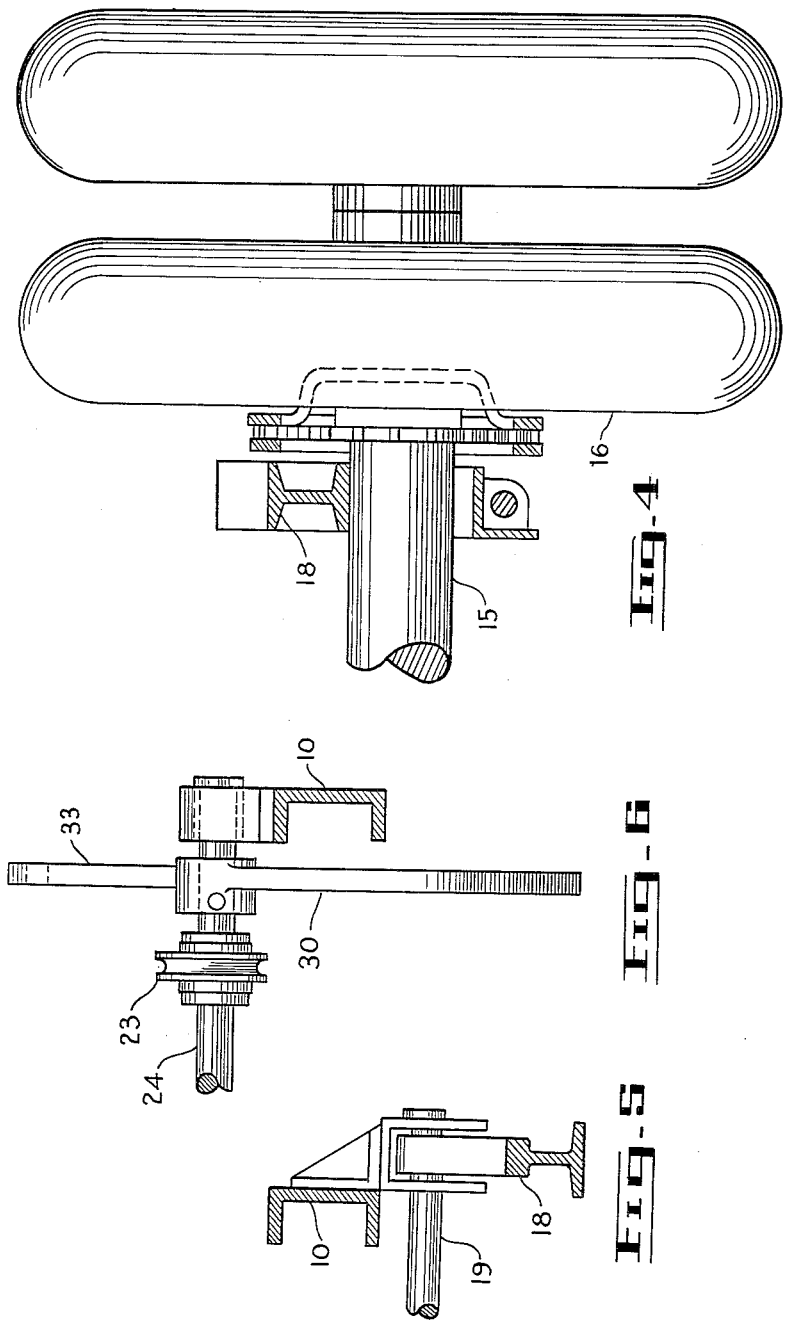

United States Patent Office 2,712,856
Patented July 12, 1955

2,712,856

RETRACTABLE DRIVE WHEEL LIFT AND HANGER

John H. MacPhee, James River Station, Nova Scotia, Canada

Application May 10, 1954, Serial No. 428,473

1 Claim. (Cl. 180—15)

This invention concerns an improvement in lifting mechanism for raising and lowering the retractable trailing truck of a vehicle equipped with such truck. The invention is particularly concerned with an improvement over my related application Serial No. 285,522, filed May 1, 1952 for "Retractable Trailer Drive For Vehicles."

It is an object of the invention herein described to provide control means and mechanism for raising and lowering a retractable trailer truck from the driving position of the vehicle. In my prior application, there is described and claimed a retractable powered truck adapted to be raised to an unloaded position and to be supported in such position by hooking means secured to the vehicle frame. My present invention seeks to avoid the inconvenience and possible hazard in accomplishing the change from a loaded to unloaded position of the trailing truck, or from the lowered to the hooked position.

Heretofore, in order to either engage or disengage the hooking means, it was required, for example, that the wheels of the trailing truck be driven upon an incline, or on blocks, or otherwise raised, before the hook might be swung clear or into supporting position. By the present invention, the operator of the vehicle is provided with controls whereby the retractable trailing truck may be raised and the locking hook means may be actuated from the cab, without inconvenience or hazard. A valuable feature of the invention lies in the provision whereby the trailing truck may be lowered whenever increased traction or load-carrying is needed, without requiring that the vehicle be stopped or that the driver leave his driving position in the cab.

A further useful feature of the invention resides in the provision of one or more locking hook means so formed as to permit the trailing truck to be carried at any one of a plurality of predetermined clearances from the ground, allowing automatic increase in traction and load capacity over soft or boggy ground, or on roadway having deep potholes. By this feature the operator may adjust the clearance while the vehicle is in motion.

According to the invention, a trailing truck comprising a pair of load-supporting wheel sets carried by an axle which is adapted to pivot about an axis parallel to and forward of the axle, and load-transmitting longitudinal members bearing against the axle and pivoting about a shaft journalled in the vehicle frame, has one or more cables tied to the axle and arranged to apply lifting force through the operation of hydraulically powered piston means, effective to raise or lower the axle, and further comprises locking means operable by a remote lever, to secure or release the axle.

Also according to the invention, lifting means of the hydraulically powered type are associated with locking means providing a first retracted position of support for a powered retractable truck axle, and a second retracted support position, whereby the trailing truck may be carried with either of two clearances between the wheels and the roadway, drive being imparted to the wheels of the truck from a main pair of driving wheels.

The following description which is to be read in conjunction with the drawings will provide a clearer understanding of the foregoing and of further features of the invention which may become apparent in the embodiments disclosed.

In the drawings, wherein similar parts are designated throughout the same reference numbers.

Figure 2 is an elevation taken so as to exclude certain details in order to more clearly show the engagement of the locking hooks in the lower retracted position.

Figure 3 is a partial plan view showing the hydraulic cylinder and cables forming part of the lifting apparatus;

Figure 4 is a view partly in section showing the axle of the retractable truck, the load-transmitting member, and part of the means by which drive is applied to the wheels;

Figure 5 is a view partly in section of the bearing means about which the load-transmitting members pivot; and Figure 6 shows the locking hook and pulley associated with one of the cables of the lifting apparatus.

Figure 1:
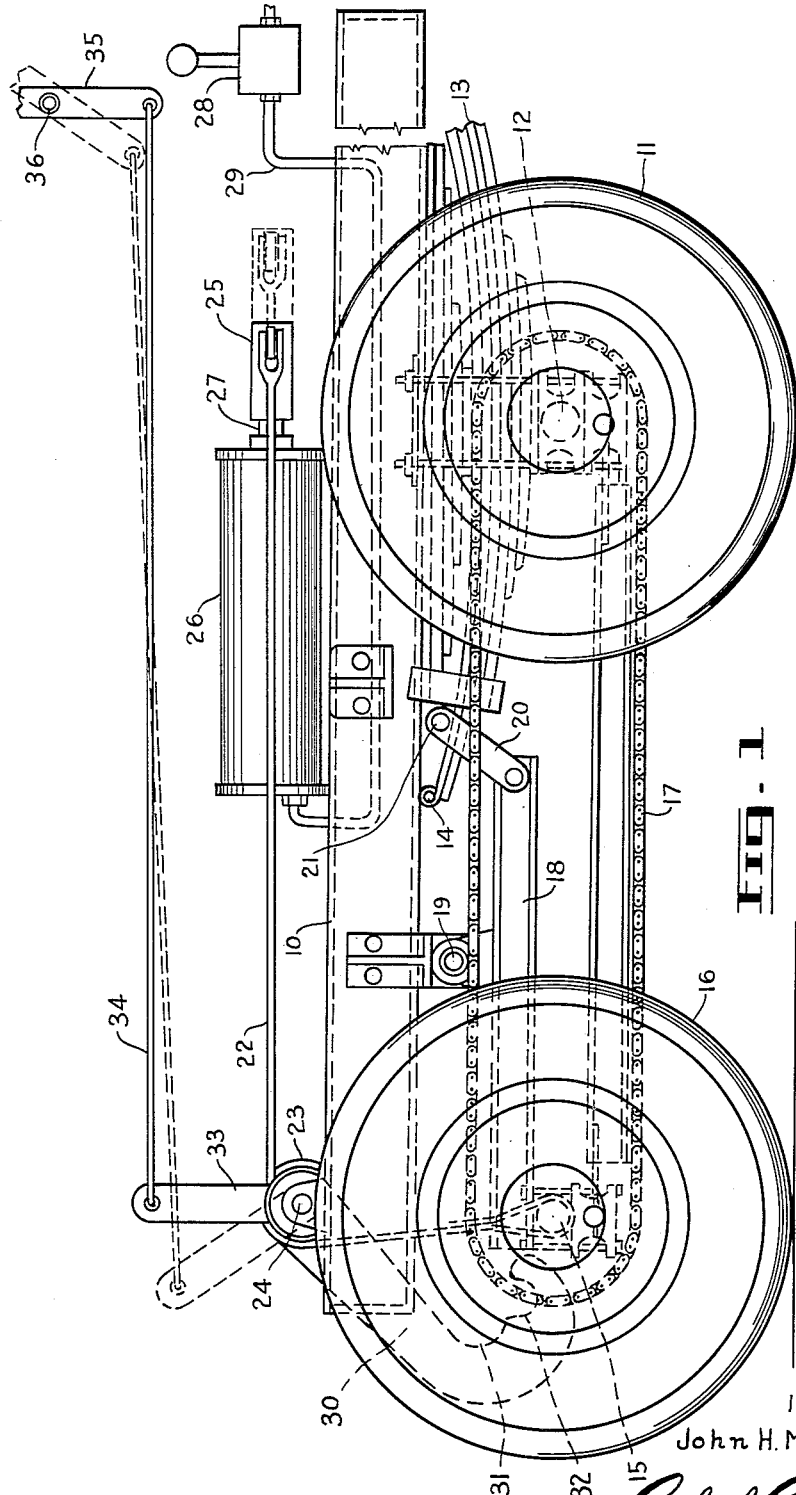
Figure 1 is an elevation of an embodiment of the invention showing the retractable truck in load-supporting position, with the locking hooks disengaged.

Turning now to Figure 1, an embodiment of the invention comprises a vehicle frame 10 supported by a main set of drive wheels 11 of a powered truck whose axle 12 carries springs 13, the ends of which are attached as at 14 to the frame of the vehicle. A trailing truck comprises an axle 15 spaced rearwardly of the powered truck, and sets of revoluble wheels 16 arranged to be driven as by roller chains 17 engaging sprockets fixed to the front and rear sets. Longitudinal load-transmitting members 18 which pivot about centers 19 fixed to the frame 10 are connected rigidly at one end to the axle 15 and at their other end shackles 20. The latter pivot about centers in the ends of the beam members, and at their other end engage the spring 13 by a roller 21 adapted to freely run upon, and apply load to, the upper leaf thereof.

The axle 15 and wheels 16 of the trailing truck are arranged to be retractable from a loaded to an unloaded position, as illustrated in Figure 2, by cables 22 tied or otherwise attached to axle 15 at one end, passing over free pulleys 23 rotatable about shaft 24 and attached at their other ends to load-balancing member 25. When hydraulic pressure is applied to cylinder 26 in such sense that the piston rod 27 moves in an outward direction, the effect is to apply tension to the cables, thereby raising axle 15. Control device 28, of a type well known in the art, is preferably located at the driving position. Pressure line or lines 29 connecting to the cylinder and a supply source (not shown) transmit hydraulic fluid via the control device 28 at pressures adjusted by the setting thereon, to cause the raising or lowering of the truck axle.

Locking hook member 30 comprises one or more hook hangers pinned to shaft 24 supported by and rotatable in journalled bracket members fixed on frame 10. A hanger includes a hook-shaped lower part having two axle-engaging notches or serrations 31 and 32, and an arm portion 33. Although the arm is illustrated in Figures 1, 2, and 6, in upwardly extending position, it is to be understood that the arm may be arranged in downwardly depending position and may even constitute a part of the hanger itself. For example, the operating link 34 may be attached at a point between axle 15 and shaft 24. Lever 35 also preferably located at the driving position of the vehicle, pivots about a point 36, and actuates link 34 which is pinned to the lower end of the lever.

As will be seen from the drawings, Figures 1 and 2, lever 35 controls the angular position of locking hook 30, so that axle 15 may be lowered from the fully retracted position and brought to bear either against notch 31 or notch 32. In the latter position, the trailing truck is carried with less clearance to the roadway than when resting with the axle held in notch 31, whereby the riding qualities and traction of the vehicle are automatically improved whenever the main trucks tend to drop into holes or soft places in a road.

While the preferred embodiments of the invention have been disclosed it is understood that minor changes in the details of construction, combination, and arrangement of cooperating parts may be resorted to within the scope of what is claimed without departing from the spirit of the invention.

The embodiments of the invention in which an exclusive property or privilege is claimed are defined as follows:

A retractable wheel drive for vehicles comprising a chassis, longitudinal beams pivotally suspended intermediate their length from said chassis, an axle attached to one end of said beams, drive wheel mounted on said axle, pulleys mounted on said chassis above said axle, cables attached at one end to said axles and trained over said pulleys, hydraulic means connected to the opposite ends of said cables for actuating the cables to raise and lower said axle, hangers pivotally suspended from said chassis above said axle having arcuate hooks at their lower ends adapted to engage beneath said axle when the axle is raised, the inner curved edge of the hooks having spaced arcuate notches for receiving and supporting said axle at different retracted positions and means for swinging said hangers into and out-of-engaging relation with said axle.

References Cited in the file of this patent

UNITED STATES PATENTS

| | | |
|---|---|---|
| 1,981,593 | Fageol | Nov. 20, 1934 |
| 1,989,745 | Farris | Feb. 5, 1935 |
| 2,136,570 | Walker | Nov. 15, 1938 |
| 2,164,845 | Steed et al. | July 4, 1939 |
| 2,175,776 | Jeremiah | Oct. 10, 1939 |
| 2,568,231 | Grossman | Sept. 18, 1951 |
| 2,659,446 | Willock | Nov. 17, 1953 |

FOREIGN PATENTS

| | | |
|---|---|---|
| 467,309 | Germany | Oct. 23, 1928 |